United States Patent
Moshrefi et al.

(10) Patent No.: US 8,452,263 B2
(45) Date of Patent: May 28, 2013

(54) END OF CALL SERVICES

(75) Inventors: Afshin Moshrefi, Newburyport, MA (US); Michelle Felt, Randolph, NJ (US); Nader Gharachorloo, Ossining, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 286 days.

(21) Appl. No.: 12/510,695

(22) Filed: Jul. 28, 2009

(65) Prior Publication Data

US 2011/0028137 A1 Feb. 3, 2011

(51) Int. Cl.
*H04L 12/58* (2006.01)

(52) U.S. Cl.
USPC .......... 455/412.1; 455/412.2; 455/414.2; 455/414.3; 455/418; 455/566

(58) Field of Classification Search
USPC ........... 455/418, 566, 412.1, 412.2, 414.2, 455/414.3
See application file for complete search history.

(56) References Cited

U.S. PATENT DOCUMENTS

| | | | |
|---|---|---|---|
| 2004/0077340 A1* | 4/2004 | Forsyth | 455/414.1 |
| 2006/0276201 A1* | 12/2006 | Dupray | 455/456.1 |
| 2008/0195457 A1* | 8/2008 | Sherman et al. | 705/10 |
| 2008/0318559 A1* | 12/2008 | Porco | 455/414.2 |
| 2009/0029721 A1* | 1/2009 | Doraswamy | 455/456.3 |
| 2010/0042911 A1* | 2/2010 | Wormald et al. | 715/205 |
| 2010/0049608 A1* | 2/2010 | Grossman | 705/14.55 |
| 2010/0082972 A1* | 4/2010 | Benco et al. | 713/155 |
| 2010/0106803 A1* | 4/2010 | Strand | 709/219 |

* cited by examiner

*Primary Examiner* — Barry Taylor

(57) ABSTRACT

A method may include receiving user preference information associated with display of content items. A triggering activity may be identified at a user device. Context information associated with the user device may be determined. A content item may be selected for display on the user device from a plurality of available content items based on the user preference information and the context information. The selected content item may be displayed on the user device.

23 Claims, 7 Drawing Sheets

| | Content Type | Time range, Day range, Date, Alert, Location | Priority |
|---|---|---|---|
| 505-1 | Location-based Ad | 6PM-7PM, Mon-Fri, *, *, * | 1 |
| 505-2 | Grocery Ad | *, Weekends, *, *, 1234 Anywhere Dr., Herndon, VA | 4 |
| 505-3 | Voicemail Ad | *, *, *, *, * | 1 |
| 505-4 | Sale Ad | 8AM-8PM, Weekends, *, *, Mall Address | 5 |
| 505-5 | Calendar Reminder | 12AM-12PM, *, June 12, 2009, Birthday, * | 3 |
| ⋮ | ⋮ | ⋮ | ⋮ |
| 505-N | Content Type | Time range, Day range, Date, Alert, Location | Priority |

| | Content Type | Time range, Day range, Date, Alert, Location | Priority |
|---|---|---|---|
| 505-1 | Location-based Ad | 6PM-7PM, Mon-Fri, *, *, * | 1 |
| 505-2 | Grocery Ad | *, Weekends, *, *, 1234 Anywhere Dr., Herndon, VA | 4 |
| 505-3 | Voicemail Ad | *, *, *, *, * | 1 |
| 505-4 | Sale Ad | 8AM-8PM, Weekends, *, *, Mall Address | 5 |
| 505-5 | Calendar Reminder | 12AM-12PM, *, June 12, 2009, Birthday, * | 3 |
| 505-N | ... | ... | ... |

END OF CALL SERVICES

BACKGROUND INFORMATION

As mobile consumer electronic devices, such as mobile phones, personal digital assistants (PDAs), portable gaming devices, etc., have become increasingly ubiquitous, the complexity of the devices has also increased. Unfortunately, despite the large number of services, features, and applications now available on such devices, usage is often limited by the difficulty in accessing or activating the service, feature, or application. In some instances, it has been determined that adding a single user action (e.g., a click, button press, etc.) to the process required to access a feature, decreases usage of the feature by up to 50%.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Implementations described herein relate to a device, method, and system for providing dynamic content (e.g., advertising supported content) to a user device in response to occurrence of a triggering activity. In some implementations, a mobile telephone or other portable electronic device may identify the occurrence of a triggering activity, such as the end of a telephone call. The device may monitor context information associated with the device (e.g., time, date, location, etc.) and may select a display item based on the context information in combination with user profile information. The user profile information may include preferences or settings related to displaying items. The user profile information may be received by the device and stored for subsequent retrieval. In some embodiments, the selected display item may be retrieved from a content source, such as a content provider, via a computer network. Logic associated with the device may be configured to track interactions with other identified devices based on a set of predetermined conditions.

Figure 1A:
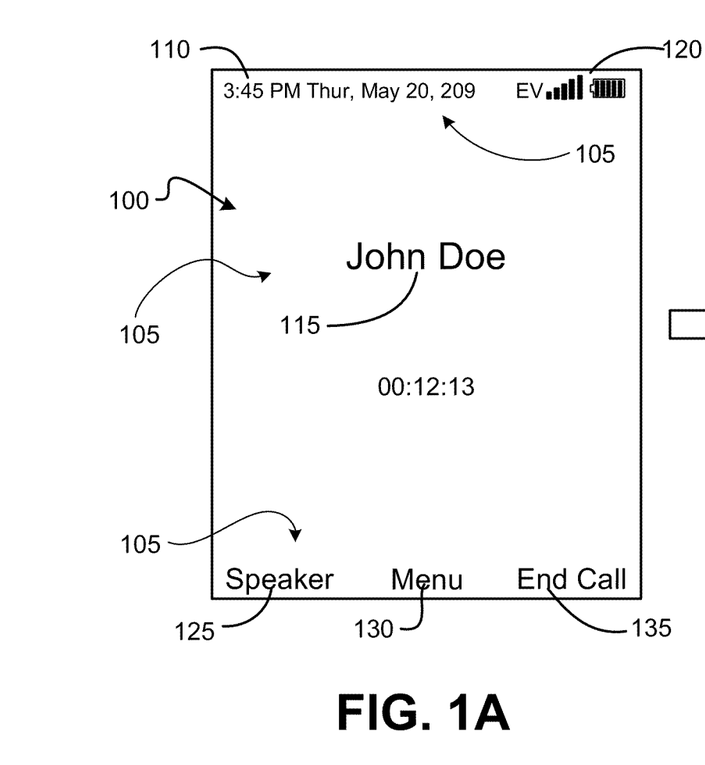
FIGS. 1A and 1B illustrate exemplary user interfaces that include content consistent with embodiments described herein.
Figure 1B:
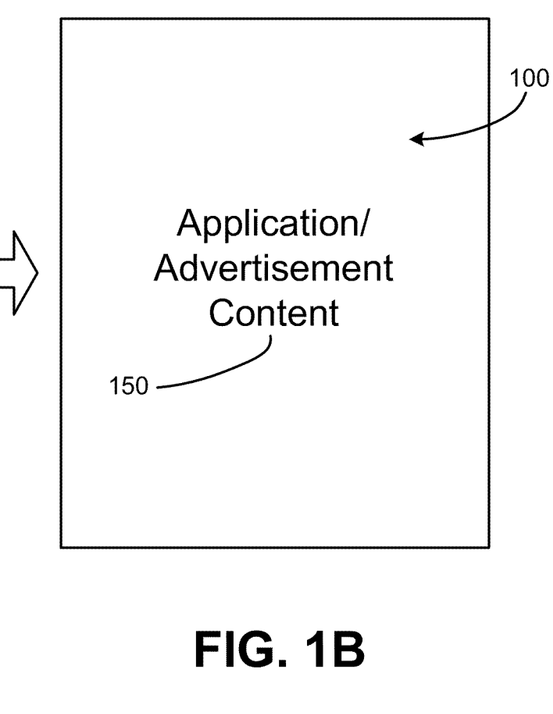

FIGS. 1A and 1B are illustrations of exemplary user interfaces that include content consistent with embodiments described herein. As illustrated in FIG. 1A, a user device may include a display area 100 configured to include on or more graphical elements 105 for providing visual information to a user. Depending on the function being performed by the user device, display 100 may include different types and layouts of graphical elements 105.

For example, as depicted in FIG. 1A, if the user device is a mobile telephone, display 100 may be configured to display, during an ongoing call, various graphical elements 105 relating to the user device and/or the ongoing telephone call. Exemplary graphical elements 105 may include a clock element 110, a contact (or called identifier, e.g., telephone number) element 115, device status elements 120 (e.g., battery level and/or signal strength indicators), a left soft key description element 125 indicating that selection of the left soft may activate a speakerphone function, a center soft key description element 130 indicating that selection of a center soft key may bring up a main menu of the device, and a right soft key description element 135 indicating that selection of the left soft may terminate the call. It should be noted that this recitation of elements is exemplary only and that any suitable number or type of graphical elements 105 may be provided on display 100 during a telephone call, such as images of the contact, etc.

Consistent with implementations described herein, the user device may be configured to provide configurable and dynamic information to the user upon completion of a telephone call. As generally depicted in FIG. 1B, upon completion of telephone call (FIG. 1A), the user device may be configured to display dynamic, context-related information to the user via display 100, as illustrated by item 150. More specifically, in one implementation, the dynamic, context-related information displayed on display 100 may be based on a combination of user profile information as well as time/date/location information. Exemplary user profile information may include designations relating to the types of information that the user may wish to receive/view, as well as the timing associated with the information.

For example, a user profile may indicate that a user wishes to receive location-based advertisements or coupons relating to dining choices from 11 AM-12 PM on weekdays. Based on this information, as well as the time/date/location information associated with the device, display 100 may display an advertisement for a local restaurant upon completion of a call between 11 AM and 12 PM on weekdays. In some implementations, the advertisement information may be retrieved dynamically from a network resource at the time of display. In other implementations, the advertisement information may be received at an earlier time (e.g., during device synchronization).

In addition to advertisement information, many other types of information may be provided at the end of a call. For example, user-defined alerts (e.g., calendar alerts, etc.), voicemail messages indications (e.g., a listing of visual-type voicemail messages), text messages, weather forecast information, stock market quotes, to do list reminders, call reminders, etc., may be provided based on use context in addition to the profile information provided by the user. In this manner, useful information may be provided to the user at a time during which the user is typically actively engaged with the user device, without requiring significant actions on the part of the user.

Figure 2:
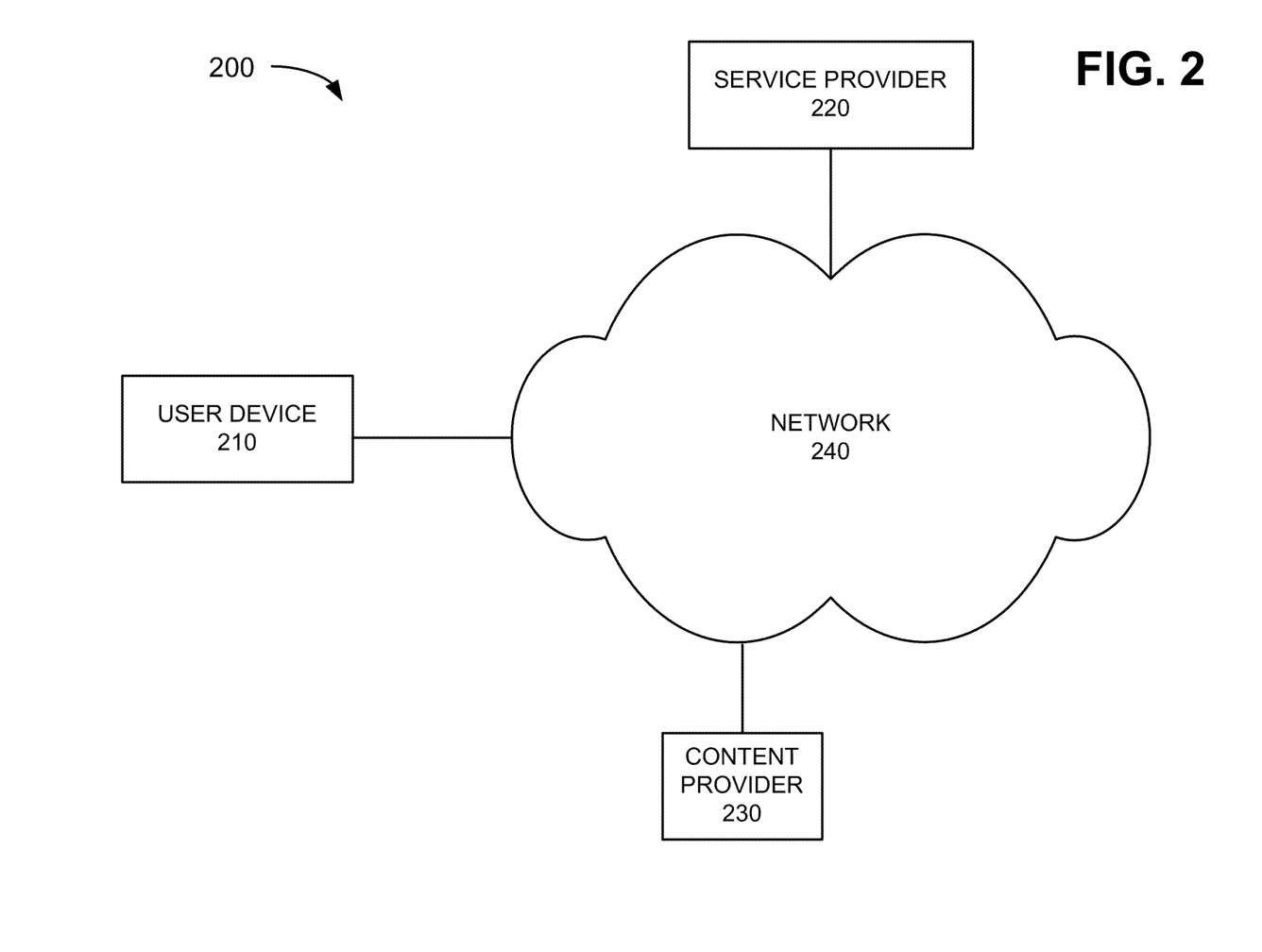
FIG. 2 illustrates an exemplary network in which systems and methods described herein may be implemented.

FIG. 2 is a block diagram of an exemplary network 200 in which systems and methods described herein may be implemented. As illustrated, network 200 may include user device 210, service provider 220, content provider 230, and network 240.

User device 210 may include any type of device that is able to receive, generate, and/or output data, such as text data, video data, image data, audio data, multi-media data, etc. In an exemplary implementation, user device 210 may include a telephone device, such as a cellular telephone or home/office (e.g., landline) telephone. However, as used herein, the phrase "user device" may include a portable media player (PMP) (e.g., an MPEG audio layer 3 (MP3) player); a video game playing device; a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance (e.g., an Internet appliance) that includes a radiotelephone transceiver.

As described in detail below, user device 210 may be configured to receive and store user profile information relating to end of call services provided to the user upon completion of a call or other defined triggering activity. In some implementations, the user profile information may be received via direct user input with user device 210. In other implementations, the user profile information may be received from service provider 220 via network 240. User device 210 may be further configured to monitor context elements, such as time of day, day of week, day of month, geographic location, party spoken with, etc. Upon occurrence of the triggering activity (e.g., completion of a telephone call), user device 210 may be configured to present information to the user, based on the stored user profile information, and the context elements.

Service provider 220 may include one or more computing devices, servers and/or backend systems that are able to connect to network 240 and transmit and/or receive information to/from user device 210 via network 240. In an exemplary implementation, service provider 220 may include a telecommunications service provider capable of facilitating communications between multiple user devices 210. In addition, service provider 220 may facilitate transmission of data from content provider 230 to user device 210 via network 240.

Content provider 230 may include any device or combination of devices capable of transmitting and/or receiving information from service provider 220 and/or user device 210. For example, content provider 230 may include a web server capable of responding to requests for information from user device 210. Alternatively, content provider 230 may include an advertisement server capable of transmitting advertisement information to user device 210 in response to requests from user device 210 upon occurrence of the triggering activity.

Network 240 may include one or more wired, wireless and/or optical networks that are capable of receiving and transmitting data, voice and/or video signals, including multimedia signals that include voice, data and video information. For example, network 240 may include one or more public switched telephone networks (PSTNs) or other type of switched network. Network 240 may also include one or more wireless networks and may include a number of transmission towers for receiving wireless signals and forwarding the wireless signals toward the intended destinations. Network 240 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data. User device 210, service provider 220, and content provider 230 may connect to network 240 via any conventional technique, such as wired, wireless, or optical connections, to transmit commands and/or provide information to user device 210.

The exemplary configuration illustrated in FIG. 2 is provided for simplicity. It should be understood that a typical network may include more or fewer devices than illustrated in FIG. 2. For example, network 200 may include additional elements, such as switches, gateways, routers, backend systems, etc., that aid in routing information, such as advertisement-related information from service provider 220 to user device 210. In addition, although only a single instance of user device 210, service provider 220, and content provider 230 are shown in FIG. 2, it should be understood that network 200 may include multiple instances of each network element.

Figure 3:
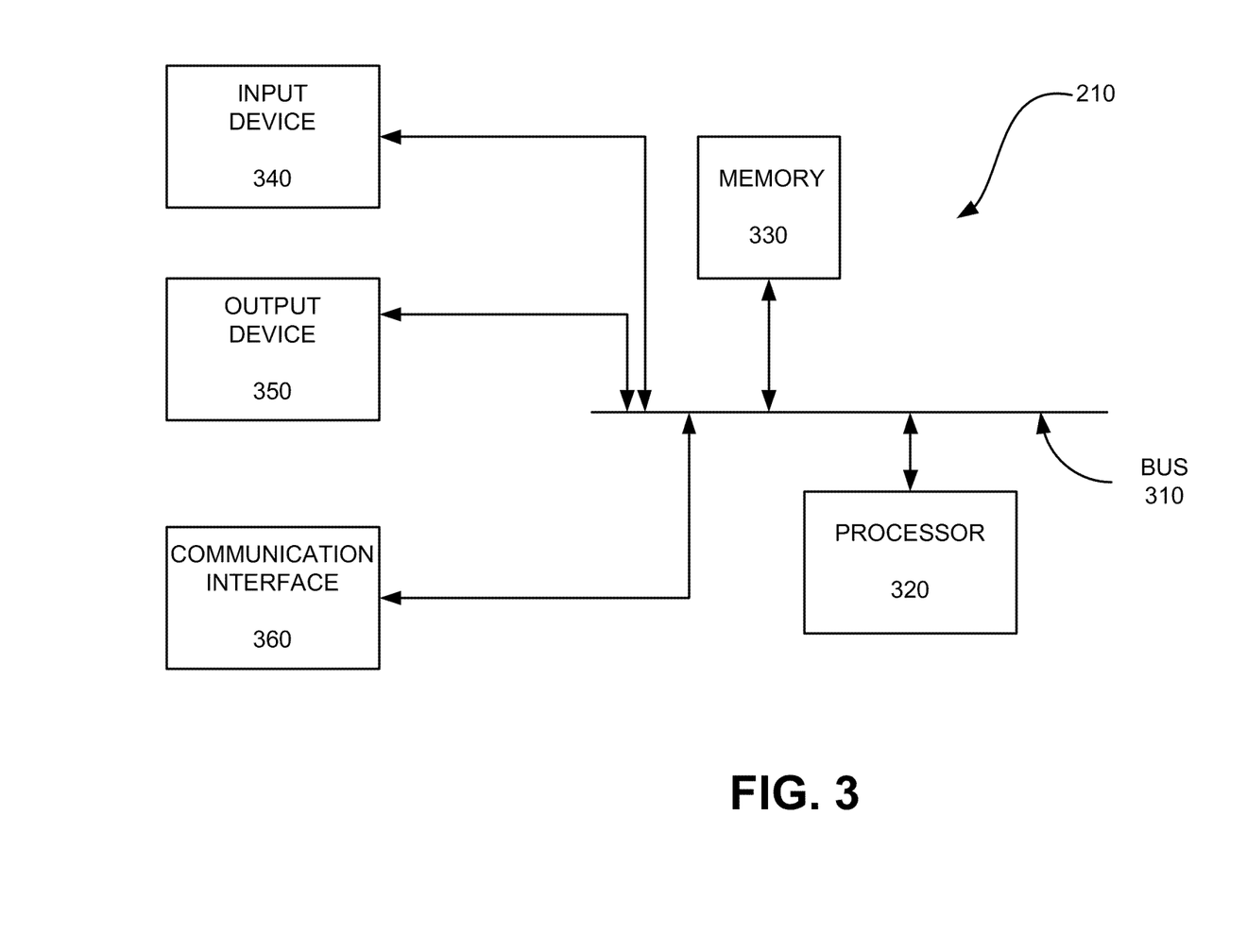
FIG. 3 illustrates an exemplary configuration of the user device of FIG. 2.

FIG. 3 illustrates an exemplary configuration of user device 210. Service provider 220, and content provider 230 may be configured in a similar manner. Referring to FIG. 3, user device 210 may include a bus 310, a processor 320, a memory 330, an input device 340, an output device 350 and a communication interface 360. Bus 310 may include a path that permits communication among the elements of user device 210.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive. In an exemplary implementation, memory 330 may store/display advertising received from service provider 230, as described in detail below.

Input device 340 may include a mechanism that permits a user to input information to user device 210, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD), a touch screen display, etc.), a speaker, a printer, etc.

Communication interface 360 may include any transceiver-like mechanism that user device 210 may use to communicate with other devices (e.g., service provider 220 and/or content provider 230). For example, communication interface 360 may include mechanisms for communicating with service provider 220, content provider 230, and/or other devices via wired, wireless or optical mechanisms. Communication interface 360 may also include one or more radio frequency (RF) transmitters, receivers and/or transceivers and one or more antennas for transmitting and receiving RF data via network 240. Communication interface 360 may further include a wireless interface for communicating with other devices in network 200, such as service provider 220 (e.g., a cellular transmission tower, a wireless router device, etc.). Communication interface 360 may also include a modem or an Ethernet interface to a LAN or other mechanisms for communicating via a network, such as network 240 or another network via which user device 210 communicates with other devices/systems.

The exemplary configuration illustrated in FIG. 3 is provided for simplicity. It should be understood that user device 210, service provider 220, and/or content provider 230 may include more or fewer devices than illustrated in FIG. 3. For example, various modulating, demodulating, encoding and/ or decoding components, one or more power supplies or other components may be included in one or more of user device 210, service provider 220, and/or content provider 230.

As briefly described above, user device 210 may perform processing associated displaying dynamic information to a user. For example, user device 210 may perform processing associated with identifying occurrence of a triggering activity, retrieving a user profile, and displaying information based on the user profile. The user profile may include information relating to types of content the user may be interested in seeing, as well as details relating to the circumstances warranting such display. In some implementations, user device 210 may retrieve information from network resources, such as service provider 220 and/or content provider 230 for inclusion in the displayed content.

User device 210 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
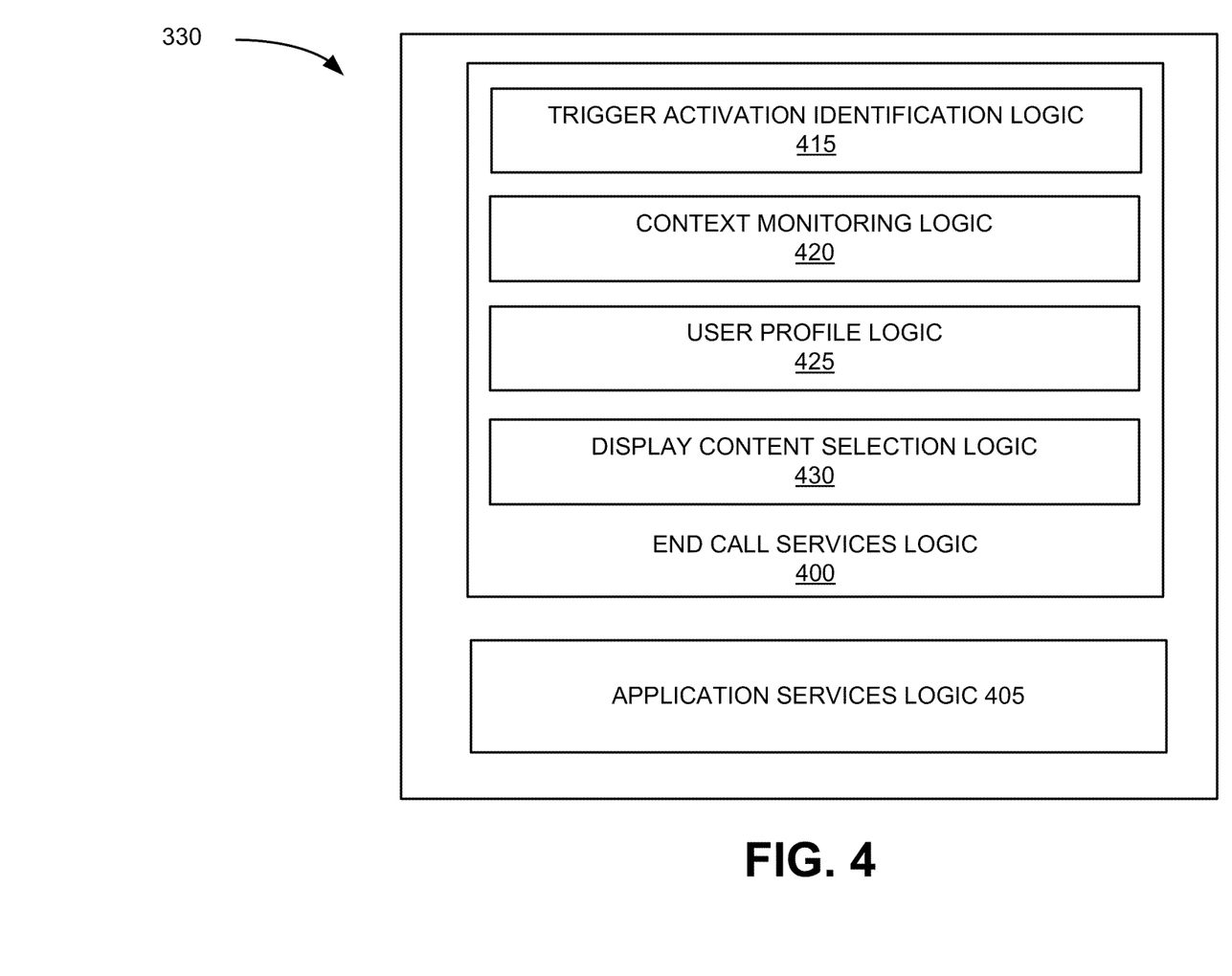
FIG. 4 illustrates an exemplary configuration of logic components implemented in the user device of FIG. 2.

FIG. 4 is an exemplary functional block diagram of components implemented in user device 210 of FIG. 2. In an exemplary implementation, all or some of the components illustrated in FIG. 4 may be stored in memory 330. For example, referring to FIG. 4, memory 330 may include end call services logic 400, and application services logic 405.

End call services logic 400 may include hardware and/or software configured to present dynamic content to a user of user device 210 (e.g., via output device 350) upon the occurrence of predefine triggering activities. More particularly, as illustrated in FIG. 4, end call services logic 400 may include triggering activity identification logic 415, context monitoring logic 420, user profile logic 425, and display content selection logic 430.

Triggering activity identification logic 415 may include hardware and/or software components configured to determine when user device 210 experiences an activity that triggers content display in the manner described herein. For example, as described above, a triggering activity may include the ending of a telephone call. In this embodiment, triggering activity identification logic 415 may determine when a telephone call has ended and may initiate the execution of display content selection logic 430.

Context monitoring logic 420 may include hardware and/or software components configured to monitor conditions associated with user device 210, such as a time of day, a day of week, a day of month, a geographic location, battery level, and/or alert conditions. Context monitoring logic 420 may be configured to obtain and/or retrieve the context information from application services logic 405 that interacts with various components within user device 210, such as an operating system clock, a calendar application, a global positioning system (GPS) system, an device alert system, etc. As will be described in additional detail below, display content selection logic 430 may retrieve the monitored context information from context monitoring logic 420 to facilitate selection of suitable display content for display on user device 210 upon occurrence of the triggering activity.

User profile logic 425 may include hardware and/or software components configured to receive and store profile information relating to the types of content desirable for viewing by the user and circumstances corresponding to the display. In some implementations, user profile logic 425 may receive information for populating a user profile from within user device 210. For example, a user may set up execution of the end call services application by creating a user profile or generating user settings. In this implementation, end call services logic 400 may generate a graphical user interface (GUI) or other interface (e.g., voice-based interface) for receiving profile settings from the user. Exemplary profile settings may include types of content, days/times of content display associated with the selected types, alert displays, etc., preferable communication types, etc. Upon creation, the profile settings may be stored, e.g., in a database structure in memory 330 of user device 210.

In alternative implementations, the user profile information may be received via channels outside of user device 210. For example, a web site associated with service provider 220 may be configured to receive user profile information for use by end call services logic 400. Alternatively, an interactive voice response (IVR) system or call center associated with service provider 220 may be configured to receive this information. Once profile information has been obtained, it may be transmitted (e.g., "pushed), to user device 210 for use by end call services logic 400. Alternatively, the profile information may be stored remotely from user device 210 and accessed via network 240 by end call services logic 400.

Figure 5:
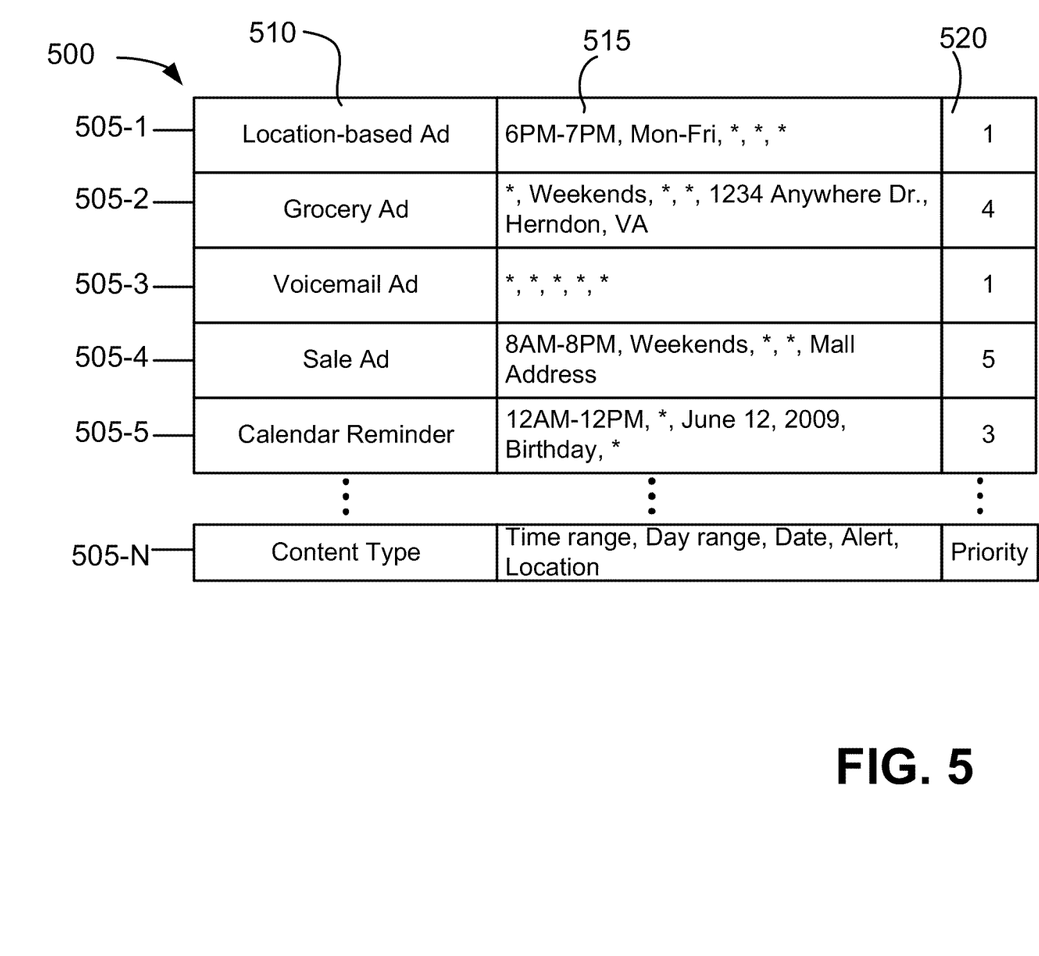
FIG. 5 illustrates a structure of an exemplary user profile database for storing user profile information received by the user profile logic of FIG. 4.

FIG. 5 is illustrates a structure of an exemplary user profile database 500 for storing user profile information received by user profile logic 425. User profile database 500 may be stored in memory 330 of user device 210. Referring to FIG. 5, user profile database 500 may include a number of entries corresponding to different types of displayable content (entries 505-1 to 505-N, collectively referred to as entries 505). Although only a single user profile is depicted in database 500, it should be understood that user profile database 500 may be configured for multiple users by including a user identification element within each entry, or in other known ways.

In an exemplary embodiment, each profile entry 505 may include a content type field 510, a context field 515, and a priority field 520. In some implementations, fields 510-520 may include more than one item of information. The additional information may be received in sub-fields, or may received in additional ways, such as comma-delimited lists, etc. For example, context field 515 may receive information in an ordered manner, such as time range, day range, date, alert status, and geographic location. Elements of information not required for a particularly entry may be designed by a wildcard, such as an asterisk (*).

Content type field 510 may include an identifier corresponding to a particular type of content to be displayed. Exemplary content type identifiers, may include: food ad, sale ad, grocery ad, entertainment ad, simple ad, voicemail ad, location-based ad, stock quotes, calendar reminder, alert notifier, sports score notifier, etc.

Context field 515 may include a listing of context elements that must be met for the entry to be executed by display content selection logic 430 upon occurrence of a triggering activity (e.g., end of call). As described above, context elements may include elements identified by context monitoring logic 420, such as a time of day (or range of times), a day of week (or range of days), days of month (or range of days), geographic location (within a predefined tolerance, such as, e.g., 2 miles), device alert status, contact called, etc. Furthermore, as indicated above, the various context elements may be included in a single, delimited field or in multiple subfields within context field 515.

Priority field 520 may include a priority identifier, such as a numerical value associated with the entry 505. Values included in priority field 520 may be used by display content selection logic 430 to determine which item or items to display upon occurrence of the triggering activity and/or the order in which the items are displayed.

Returning to FIG. 4, display content selection logic 430 may include a combination of hardware and/or software components configured to execute upon identification of a triggering activity by triggering activity identification logic 415 and retrieve information from context monitoring logic 420 and user profile logic 425. Based on the retrieved information, display content selection logic 430 may determine whether any profile entries match with identified context elements. For example, as illustrated in the example of FIG. 5, assume that user profile database 500 includes an entry that indicates that a location-based ad (content type field 510) is desired between the hours of 6 PM and 7 PM, Monday-Friday (context field 515). Display content selection logic 430 may retrieve context information from context monitoring logic 420 indicating that it is 6:32 PM on Thursday and also indicating the geographic location of user device 210. Display content selection logic 430 may thus determine that the current context information matches the entry 505 and may transmit a request for a location-based ad corresponding to the identified geographic location from content provider 230. In some instances, user device 210 may pre-load or otherwise receive advertisement information prior to execution of display content selection logic 430. In such an embodiment, display content selection logic 430 may retrieve the advertisement information from memory 330.

Display content selection logic 430 may receive a location-based ad responsive to the request and may display the contents of the location-based ad on user device 210 (e.g., on display/output device 350). In one implementation, display content selection logic 430 may request and/or display multiple items. The items may be displayed in an order based on, e.g., the priority values (priority field 520) corresponding to each item. In some implementations, users may scroll forward and backward through the available display items. In yet other implementations, user device 210 may store a history of previously provided display items, thereby enabling the user to retrieve previously viewed items, such as ads, coupons, reminders, etc.

As will be described in additional detail below, display content selection logic 430 may also interact with other applications existing on user device 210 via application services logic 405, such as telephone application, an email application, a text/instant messaging application, a navigation application, a social networking application, an internet browser application, etc. Through various application program interfaces (APIs), display content selection logic 430 may tie or access into these applications to provide enhanced interaction between displayed content items and the applications on user device 210.

Figure 6A:
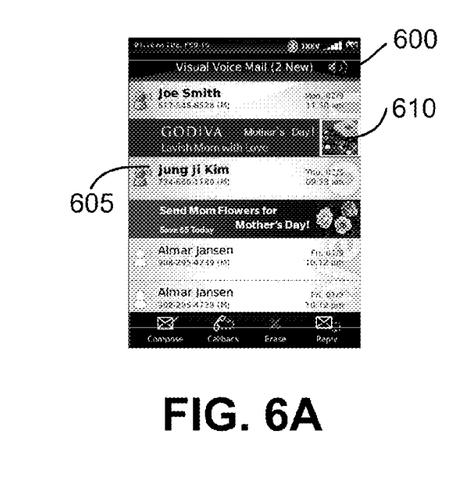
FIGS. 6A-6E are exemplary content items for retrieval and display by the display content selection logic of FIG. 4.

FIGS. 6A-6E are exemplary content items for retrieval and display by display content selection logic 430 in response to a triggering activity and matching with an entry in user profile database 500. FIG. 6A illustrates a voicemail-based content item 600. For many telecommunications systems, visual voicemail (e.g., an individually selectable listing of voicemail messages) is a paid alternative to traditional voicemail systems. To reduce or eliminate a cost of this service to users, users may opt to receive advertisements in their voicemail listing in their user profile. As depicted, content item 600 includes a listing of available voicemail messages 605 intermixed with advertisements 610.

Figure 6B:
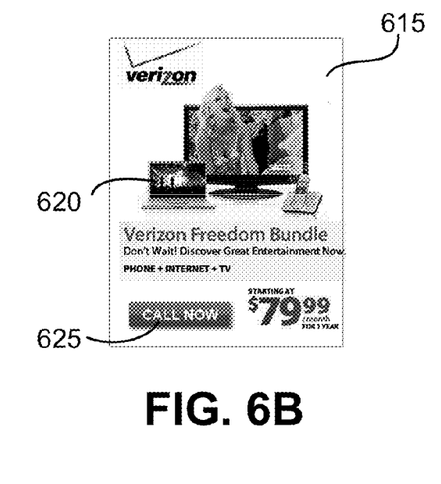

FIG. 6B illustrates a simple advertisement content item 615 having an advertisement portion 620 and a communication interface element 625. Advertisement portion may include advertising copy and/or images associated with the advertisement. Communication interface element 625 may include a selectable element for automatically contacting the advertiser, such as an interface to call the advertiser. Alternatively, selection of communication interface element 625 may initiate an email or text message communication to the advertiser.

Figure 6C:
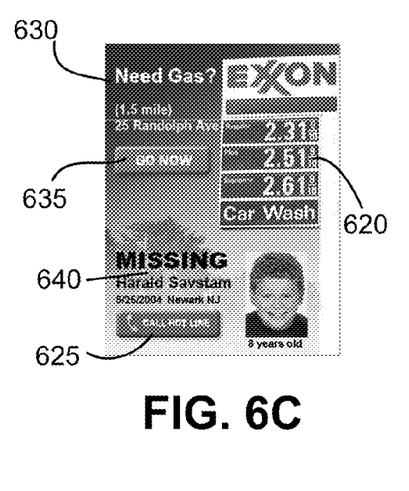

FIG. 6C illustrates a navigation-based advertisement content item 630 having advertisement portion 620, and navigation initiating element 635. Selection of navigation initiating element 635 may initiate a navigation application providing directions to the advertised location using, e.g., GPS. In one implementation, the navigation application may be a paid application not enabled on all user devices 210. To facilitate or encourage users to patronize advertisers, a service provider may enable no-charge use of the navigation application when visiting advertisers.

As illustrated in FIG. 6C, content item 630 may also include a secondary public service announcement portion 640. In this example, public service announcement portion 640 may include a missing child announcement. Furthermore, public service announcement portion 640 may include a communication interface element 625 for initiating a call (or other communication) to personnel associated with the public service announcement (e.g., the police, etc.).

Figure 6D:
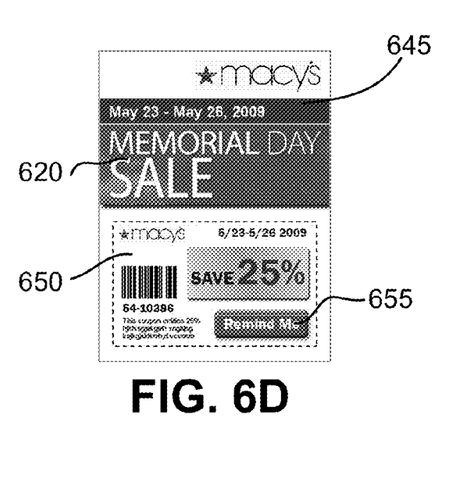

FIG. 6D illustrates a coupon content item 645 having advertisement portion 620, a coupon element 650, and a reminder initiating element 655. Advertisement portion 620 may include advertising copy relating to the advertiser and the coupon. Coupon element 650 may include coupon details and may further include a bar code or other element that may be scanned at a retail location. Alternatively, coupon element 650 may include a coupon code that may be used in an online transaction or at a retail location. Reminder initiation element 655 may initiation creation of a reminder in a to do list or calendar application associated with user device 210. In one implementation, a reminder initiated via reminder initiation element 655 may be set to a default reminder time, such as one day.

Figure 6E:
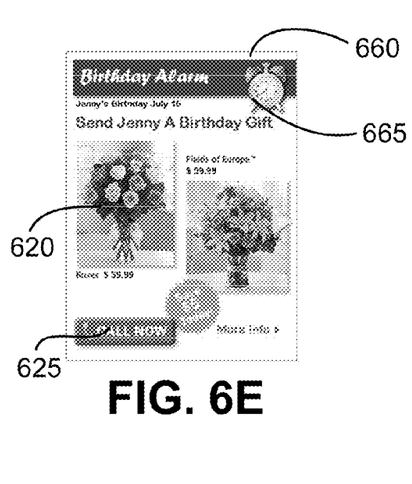

FIG. 6E illustrates a calendar reminder content item 660 having a reminder portion 665, advertisement portion 620, and communication interface element 625. Reminder portion 665 may include details retrieved from a calendar application on user device 210. Advertisement portion 620 may include an advertisement related to the event the user is being reminded about, such as a birthday. Other calendar reminders may include anniversary reminders, holiday reminders (e.g., secretary's day), etc.

Figure 7:
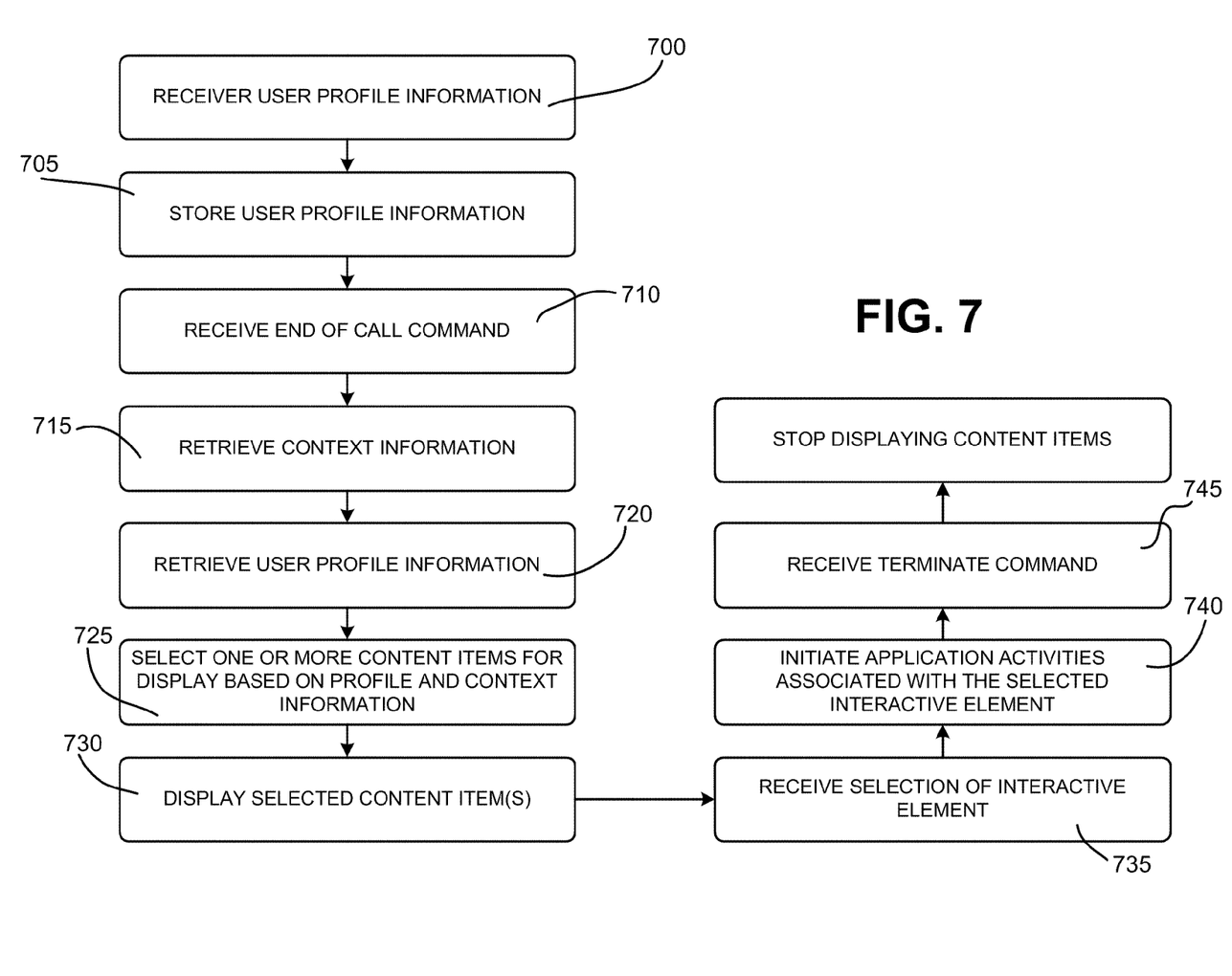
FIG. 7 is a flow diagram illustrating exemplary processing associated with displaying dynamic content items in accordance with embodiments described herein.

FIG. 7 is a flow diagram illustrating exemplary processing associated with displaying dynamic content items in accordance with embodiments described herein. Processing may begin upon receipt of user profile information (block 700). As described above, user profile information may be received by user device 210, or via service provider 220 (e.g., via a web interface associated with service provider 220). Exemplary user profile information may include content type selections, timing selections, contact preference selections, priority settings, etc. associated with the user of user device 210. The received user profile information may be stored, e.g., in a database, such as user profile database 500 (block 705).

An end call command or other triggering activity may be received or identified (block 710). For example, as described above, one exemplary content delivery trigger may include the ending of a call. In this implementation, triggering activity identification logic 415 may determine when that the telephone call has ended or that a user has selected (e.g., pressed) an end call command or button. Other suitable content delivery triggering activities may include powering on user device 210, sending a text message, etc. In still other implementations, multiple events or combinations of events may be used as triggering activities. For example, a GPS event (e.g., reaching a predefined location, traveling at a predetermined speed, etc.) may be used as a triggering activity, either alone or in combination with other events, such as the ending of a telephone call, etc. In addition, the occurrence of one or more alert may be used as a triggering activity. Exemplary alerts may include program generated notifications, such as amber alert (missing child) or other emergency alert, time/date alert, calendar alerts, traffic or weather alerts, etc.

In some implementations, the triggering activity may include commands or selections already associated with other functions. For example, in the end of call scenario, a user selection an "End Call" button may routinely press this button at the conclusion of every call. At this point the user's attention is on device 210 without requiring additional command selection or button presses.

As briefly discussed above, combinations of events may be used as a triggering activity. For example, the ending of a telephone call within 1 mile of a shopping location or the combination of an occurrence of a calendar alert and exiting a browser application may be used as triggering activities for providing dynamic content on user device 210. The triggering activities may be identified by triggering activity identification logic 415.

Context information may be retrieved (block 715). For example, context information may be retrieved from context monitoring logic 420. Information such as time of day, day of week, day of month, month of year, calendar information (e.g., upcoming events, alerts, etc.), temperature, etc., may be retrieved from context monitoring logic 420).

User profile information may be retrieved (block 720). For example, user profile information may be retrieved from user profile database 500. As described above, the user profile information may include preferred content type selections, timing selections, contact preference selections, priority settings, etc., associated with the user. In some implementations, the user profile information may be retrieved from a memory (e.g., memory 330) in user device 210. In other implementations, the user profile information may be retrieved from a remote resource via a network (e.g., network 240).

One or more content items may be selected for display on user device 210 (block 725). For example, display content selection logic 430 may select or filter items to display from a number of available display items based on the retrieved user profile information and context information. Exemplary display items may include visual voicemail advertisements, simple advertisements, navigation-based advertisements, location-based advertisements, coupons, calendar alerts, stock quotes, reminders, etc.

As described above, content items may be retrieved from memory 330 of user device 210 or may be retrieved via network 240, e.g., from content provider 230 or other remote resources. In one implementation, elements of context information and user profile information may be transmitted from user device 210 to content provider 230 as a request for one or more relevant content items for display on user device 210. For example, user device 210 may transmit a request to content provider 230 that identifies a content type of location-based advertisement and the geographic location information associated with user device.

User device 210 may receive one or more content items responsive to the request from content provider 230. In the event that user devices 210 receives more than one content item for display, display content selection logic 430 may filter or select an item or items to display based on a priority value associated with the type of content in the user profile. In one implementation, the priority information may be based on fees charged to advertisers for serving or providing their ads to consumers.

Upon selection, the selected content item(s) may be displayed on user device 210 (block 730). As described above, content items displayed on user device 210 may include interactive elements, such as communication interface elements 625, navigation initiating elements 635, and reminder initiating elements 655. Selection of an interactive element may be received (block 735). User device 210 may initiate application activities associated with the selected interactive element (block 740). For example, a user selection of a "call now" element may cause a telephone application on user device 210 to automatically initiate a telephone call to a telephone number associated with the display item. Similarly, a user selection of a "go there" element may cause a navigation application on user device 210 to determine and display directions to an address associated with the selected display items. In one implementation, displayed items may be stored in a history, cache or other memory for subsequent retrieval by the user. In one implementation, a user may be able to scroll back through a predetermined number (e.g., 10) of previously displayed items.

User device 210 may receive a terminate end call services command (block 745). In some implementations, this command may be implicitly received upon turning off, putting to sleep, or closing user device 210. For example, in the case of a clamshell-style mobile telephone device, the terminate end call services command may be received when the user closes the clamshell. Alternatively, the terminate end call services command may coincide with a sleep event, triggered by either a discrete user command (e.g., button press, gesture, etc.) or elapsing of a predetermined period of inactivity of user device 210. Regardless of the manner in which the terminate end call services command is received, user device, in response, may stop displaying the one or more display items (block 750).

Implementations described herein relate to a device, method, and system for providing dynamic content (e.g., advertising supported content) to a user device in response to occurrence of a triggering activity. In some implementations, a mobile telephone or other portable electronics device may identify the occurrence of a triggering activity, such as ending a telephone call. The device may monitor context information associated with the device (e.g., time, date, location, etc.) and may select a display item based on the context information in combination with user profile information. The user profile information may include preferences or settings related to displaying items. The user profile information may be received by the device and stored for subsequent retrieval. In some embodiments, the selected display item may be retrieved from a content source, such as a content provider, via a computer network. Logic associated with the device may be configured to track interactions with other identified devices based on a set of predetermined conditions.

Furthermore, in some implementations, display of an item may support applications or services available to the user device. For example, communications, Internet browsing, and navigation services or applications available on the user device may be interacted with or initiated by interaction with displayed items. Because some of these services may be paid services not available on all devices, advertisement support may enable activation of these features. In some embodiments, the activation of the services may be limited to advertiser-related instances, while in other embodiments, advertisement-support services may be enabled for other non-advertiser-related instances.

In some implementations, advertisements or other content items may be provided without reference to user profile or preference information. For example, a user's telecommunications plan may be reduced in exchange for enabling the providing of advertisements or other content to the user in response to occurrences of triggering actions. Selection of content for display on user device 210 may be based on fees paid by advertisers to server provider 220.

The foregoing description of exemplary implementations provides illustration and description, but is not intended to be exhaustive or to limit the embodiments described herein to the precise form disclosed. For example, although the above-description relates primarily to and end of call scenario as a triggering activity, other triggering activities may be used, such as device power on, message sending, application exiting, etc. Modifications and variations are possible in light of the above teachings or may be acquired from practice of the embodiments.

Further, while series of acts have been described with respect to FIG. 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving user preference information associated with display of content items, wherein the user preference information identifies one or more content types and a context and a priority associated with each of the one or more content types;
   identifying a triggering activity at a user device;
   determining context information associated with the user device upon identification of the triggering activity;
   identifying the one or more content types identified in the user preference information that correspond to the determined context information;
   selecting a content item having a first content type of the one or more content types for display on the user device from a plurality of available content items based on the user preference information, the context information, and the priority associated with the first content type, wherein the selected content item includes at least one of: visual voicemail information, reminder information, alert information, or stock quote information; and
   displaying the selected content item on the user device.

2. The method of claim 1, wherein the user preference information comprises information relating to content types and context information corresponding to at least one content item.

3. The method of claim 1, wherein the user preference information is received at the user device from a user.

4. The method of claim 1, wherein the user preference information is received at the user device from a service provider via a network.

5. The method of claim 1, wherein the triggering activity comprises an ending of a telephone call at the user device.

6. The method of claim 5, wherein the triggering activity comprises receiving an end call command from the user during a telephone call.

7. The method of claim 1, wherein determining context information associated with the user device further comprises at least one of:
   determining a current day and time; or
   determining a geographic location associated with the user device.

8. The method of claim 1, further comprising:
   storing a history of previously displayed content items; and
   receiving a request to review the previously displayed content items.

9. The method of claim 1, wherein selecting the content item having the first content type further comprises:
   transmitting a request for the content item having the first content type from a content provider via a network; and
   receiving the content item having the first content type from the content provider via the network.

10. The method of claim 9, wherein the request for the first content item includes an indication of the first content type, and a geographic location associated with the user device.

11. The method of claim 1, wherein selecting the content item having the first content type further comprises:
    transmitting a request for more than one content item having the identified one or more content types from a content provider via a network; and
    receiving the more than one content items having the identified one or more content types from the content provider via the network, and
    selecting one of the more than one content item for display on the user device.

12. The method of claim 11, wherein selecting one of the more than one content item for display on the user device is based on the priority associated with the content type corresponding to the content item.

13. The method of claim 12, further comprising:
    receiving a request to move between the received more than one content item, wherein a display order of the more than one content item is based on the priority associated with each content item.

14. The method of claim 1, wherein the selected content item displayed on the user device includes an interactive element, the interactive element comprising at least one of: a communication initiating element, a navigation initiating element, or a reminder initiating element.

15. The method of claim 1, tangibly embodied as computer-executable instructions on a computer-readable memory device.

16. The method of claim 1, wherein the one or more content types comprise two or more of: advertisements, voicemail notifications, stock quotes, calendar reminders, alert notifications, or sports score notifications.

17. A device, comprising:
an output device to display information to a user;
a memory; and
logic configured to:
  receive a user profile associated with display of content items;
  identify a triggering activity;
  determine context information associated with the device;
  identify, upon occurrence of the triggering activity, one or more content types identified in the user profile that correspond to the determined context information;
  select a content item having a first content type of the one or more content types for display on the device from a plurality of available content items based on the user profile, the context information, and a priority associated with the first content type; and
  display the selected content item on the output device.

18. The device of claim 17, wherein the user profile comprises information that corresponds selected content types to defined context criteria.

19. The device of claim 17, further comprising a communication interface configured to transmit and receive communications from a network,
wherein the user profile is received at the communication interface from a service provider via the network.

20. The device of claim 17, wherein the logic to identify a triggering activity comprises logic to receive an end call command from the user.

21. The device of claim 17, wherein the logic to select a content item for display on the user device further comprises logic to:
  determine that two or more content types identified in the user profile correspond to the determined context information;
  determining the priority associated with the two or more content types based on the user profile; and
  select the content item having the first content type for display based on the priority.

22. The device of claim 21, wherein the logic to select a content item having the first content type further comprises logic to:
  transmit a request for the content item having the first content type from a content provider via a network; and
  receive the content item having the first content type from the content provider via the network, and
  wherein the content type comprises one of: a reminder, an alert, or a stock quote.

23. A computer-readable medium having stored thereon sequences of instructions which, when executed by at least one processor, cause the at least one processor to:
  identify an end of call at a user device;
  determine at least one of a time, date, or geographic location associated with the user device;
  retrieve a user profile associated with displaying content items, wherein the user profile includes a plurality of entries corresponding to different content types;
  identify one or more entries in the user profile that corresponds to the time, date, or geographic location, the entries in the user profile identifying at least a content type and a priority value;
  select a content item for display on the user device from among a plurality of available content items based on the identified one or more entries in the user profile and the priority values corresponding to the entries; and
  display the selected content item on the user device.

* * * * *